US 9,795,071 B2
(12) United States Patent
Friggstad

(10) Patent No.: US 9,795,071 B2
(45) Date of Patent: *Oct. 24, 2017

(54) REAR FOLDING TOOLBAR IMPLEMENT

(71) Applicant: Bourgault Industries Ltd., St. Brieux (CA)

(72) Inventor: Terrance A. Friggstad, Grasswood (CA)

(73) Assignee: Bourgault Industries Ltd., St. Brieux, SK (CA)

(*) Notice: Subject to any disclaimer, the term of this patent is extended or adjusted under 35 U.S.C. 154(b) by 142 days.

This patent is subject to a terminal disclaimer.

(21) Appl. No.: 14/886,613

(22) Filed: Oct. 19, 2015

(65) Prior Publication Data

US 2016/0037705 A1 Feb. 11, 2016

Related U.S. Application Data

(62) Division of application No. 13/953,104, filed on Jul. 29, 2013, now Pat. No. 9,198,342.

(30) Foreign Application Priority Data

Aug. 1, 2012 (CA) .................................. 2784575

(51) Int. Cl.
*A01B 73/06* (2006.01)
*A01B 49/06* (2006.01)
(Continued)

(52) U.S. Cl.
CPC ............ *A01B 49/06* (2013.01); *A01B 73/067* (2013.01); *A01C 5/062* (2013.01); *A01C 23/008* (2013.01)

(58) Field of Classification Search
CPC ....... A01B 73/067; A01B 73/06; A01B 73/02; A01B 73/00; A01B 49/06; A01B 49/04; A01B 49/00; A01B 73/062; A01B 73/042; A01B 73/046; A01C 5/062; A01C 5/06; A01C 5/00; A01C 23/008; A01C 23/00
(Continued)

(56) References Cited

U.S. PATENT DOCUMENTS 3,502,154 A 3/1970 Rogers
3,651,870 A 3/1972 Calkins
(Continued)

FOREIGN PATENT DOCUMENTS

CA 2784575 A1 2/2014

*Primary Examiner* — Christopher J. Novosad
(74) *Attorney, Agent, or Firm* — Frost Brown Todd LLC

(57) ABSTRACT

Each wing of a rear folding implement has a wing frame supported on rear wheels for movement along the ground, and a forewing frame and wheel pivotally attached to the wing frame. A center ball joint pivotally connects right and left inner wings and a center wheel assembly supports the center ball joint. The wings extend laterally and the forewing frames are in a lowered position supported on their wheels when in the operating position. To move the wings into a transport position, the implement is towed forward and the wings pivot about the center ball joint to trail rearward and the forewing frames are moved upward to narrow the implement for transport. An air seeder cart hitch is rearward of and near the center ball joint in the operating position, and when the wings trail rearward the cart hitch is near rear ends of the trailing wings.

5 Claims, 24 Drawing Sheets

(51) Int. Cl.
   *A01C 5/06* (2006.01)
   *A01C 23/00* (2006.01)
(58) Field of Classification Search
   USPC ............... 172/311, 663, 666, 667, 456, 407;
   56/367, 397, 377
   See application file for complete search history.

(56) References Cited

U.S. PATENT DOCUMENTS

| | | |
|---|---|---|
| 4,286,672 A | 9/1981 | Forsyth et al. |
| 4,418,762 A | 12/1983 | Page |
| 4,418,763 A | 12/1983 | Boetto |
| 4,453,601 A | 6/1984 | Orthman et al. |
| 4,821,809 A | 4/1989 | Summach et al. |
| 5,357,884 A | 10/1994 | Bourgault |
| 5,829,370 A | 11/1998 | Bender |
| 6,076,613 A | 6/2000 | Frasier |
| 6,089,329 A | 7/2000 | Smith |
| 6,092,609 A | 7/2000 | Jeffery et al. |
| 6,213,219 B1 | 4/2001 | Mosdal et al. |
| 6,220,366 B1 | 4/2001 | Noonan |
| 6,321,850 B2 | 11/2001 | Friggstad |
| 6,374,923 B1 | 4/2002 | Friggstad |
| 6,550,543 B1 | 4/2003 | Friggstad |
| 6,935,254 B2 | 8/2005 | Ostrander et al. |
| 7,581,597 B2 | 9/2009 | Neudorf et al. |
| 7,861,795 B2 | 1/2011 | Dillon |
| 9,198,342 B2 | 12/2015 | Friggstad |
| 2004/0025766 A1* | 2/2004 | Ostrander ............ A01B 73/065 111/174 |
| 2006/0081163 A1* | 4/2006 | Auer .................... A01B 73/067 111/130 |

\* cited by examiner

REAR FOLDING TOOLBAR IMPLEMENT

This application is a divisional of and claims priority to U.S. application Ser. No. 13/953,104, filed Jul. 29, 2013 entitled "Rear Folding Toolbar Implement," which in turn claims priority to Canadian Application Serial No. 2,784,575 filed Aug. 1, 2012 entitled "Rear Folding Toolbar Implement," both of which are incorporated herein by reference in their entirety for all purposes.

FIELD

This present disclosure relates to the field of agricultural implements and in particular a tool bar implement configured to fold rearward for transport.

BACKGROUND

As farm sizes have increased over the years, agricultural implements have necessarily increased in size as well. Wider implements have been generally preferred as being more efficient for covering the increased areas, as opposed to using a plurality of smaller implements. Modern farms also typically include land that is scattered over a considerable area, requiring that these wide implements be put into a narrower transport position for travel from one field to the next on public roads. In order to do so safely while allowing other traffic to pass, and in order move under overhead utility lines, with such wide implements the width and height of implements when in this transport position is limited.

Seeding and cultivating implements typically comprise a frame mounted on wheels, where the frame comprises a plurality of parallel tool bars spaced from the front to the rear of the frame and extending laterally across the width of the implement. Tool assemblies such as cultivator shanks or furrow openers are spaced laterally along each tool bar, with ground engaging tools extending down from the frame to engage the soil.

The frame typically comprises a number of separate sections. For example one common type of wide implement has five separate sections comprising a center section, an inner wing pivotally attached to each side of the center section, and an outer wing pivotally attached to outer ends of the inner wings. The pivot axes are substantially horizontal and parallel to the operating travel direction so that the wings and center section can flex with respect to each other to follow ground contours.

A transport configuration for such an implement can be achieved in a number of different ways. U.S. Pat. No. 6,220,366 to Noonan et al. and U.S. Pat. No. 6,089,329 to Smith disclose a five section implement where the wings extend upward in transport. The outer wings are folded over to lie substantially flat above the inner wings, and then the inner wings are raised to an upright orientation such that the outer wings extend downward from the ends of the inner wings and between the inner wings. U.S. Pat. No. 6,092,609 to Jeffrey et al. illustrates an alternate configuration for folding a five section implement for transport where the outer wings are folded substantially vertical to the ends of the inner wings, and the inner wings are raised to a substantially vertical orientation with the outer wings oriented substantially horizontally and aligned end-to-end.

The above implements provide 5 separate independent sections when working in the field. Each inner wing can pivot up and down with respect to the center section, and each outer wing can pivot up and down with respect to each inner wing. Such flexibility improves the ability of the implement to flex and follow ground contours to better maintain an even depth for the ground engaging tools typically mounted on the implement.

Alternate implement configurations are known where the implement is folded horizontally rearward or forward such that the wing sections trail behind or ahead of the center section. For example U.S. Pat. No. 5,829,370 to Bender discloses a implement with only two wings which fold rearward. The Bender implement is a planter that has all tools mounted on a single lateral tool bar such that the two wings can come quite closely together.

Most typical cultivation and air seeding implements however have two or more lateral tool bars, with a correspondingly increased distance from the front to the rear of the frame. To accommodate such more typical tool bar implements, U.S. Pat. No. 7,861,795 to Dillon, for example, discloses an implement with a center section and a wing pivotally attached to each end of the center section. To achieve the transport position, the front edges of the wings move upward so that the wings are oriented vertically, and then each wing folds rearward to a trailing position. Similarly U.S. Pat. No. 6,374,923 to the present inventor Friggstad and U.S. Pat. No. 4,821,809 to Summach also disclose implements with wings that pivot upward and then fold to a trailing rearward position for transport.

It is further also known to fold the wings forward, as illustrated for example in U.S. Pat. No. 6,076,613 to Frasier.

Folding the wings upward for transport is convenient for implements such as air seeders, where a separate cart to carry agricultural products is often towed behind the implement. The upward wing orientation however becomes problematic as implement width increases because the height of the implement in the transport position can become excessive. Using the rear folding configuration reduces the height of the implement in transport, and allows for increased implement widths, however has its own problems. For example with rear folding air seeders it is difficult to arrange for towing the product cart behind.

SUMMARY

In one aspect, disclosed is a rear folding toolbar implement apparatus that overcomes problems in the prior art.

In a first embodiment, a rear folding implement apparatus comprising a plurality of wings is disclosed. Each wing comprises a wing frame supported on rear wheels for movement along the ground; a forewing frame pivotally attached to the wing frame about a substantially horizontal forewing pivot axis oriented substantially perpendicular to an operating travel direction when the forewing frame is in a field operating position; a forewing wheel mounted to a forward portion of the forewing frame; a forewing actuator mounted on the wing frame and operative to pivot the forewing frame from a raised position, where the forewing frame extends upward from the wing frame with the forewing wheel above the ground, to a lowered position where the forewing frame extends forward from the wing frame, and the forewing wheel supports the forewing frame for movement along the ground; and a plurality of ground engaging tools mounted on the wing frame and on the forewing frame. A center ball joint pivotally connects an inside end of the wing frame of a right inner wing to an inside end of the wing frame of a left inner wing, and a center wheel assembly supports the center ball joint. Right and left tow hitch poles are each pivotally connected at rear ends thereof to the wing frames of respective right and left inner wings, and are pivotally connected to each other at a tow hitch joint in proximity to opposite front ends thereof, and a tow hitch plate extends forward from the tow hitch joint. When right and left wings are in a field operating position the wings extend laterally substantially perpendicular to the operating travel direction, and the forewing frames of the wings are in the lowered position. To move the wings into a transport position, the tow hitch plate is towed forward such that the right and left inner wings pivot about the center ball joint and the wings trail rearward to a side by side transport position substantially aligned with the operating travel direction, the wing frames of the right and left wings are connected together by a transport lock, and the forewing frames are moved to the raised position.

In a second embodiment, a rear folding air seeder implement comprising a plurality of wings is disclosed, each wing supported on front and rear wheels for movement along the ground in an operating travel direction, and a plurality of furrow openers mounted on each wing. A center ball joint pivotally connects an inside end of a right inner wing to an inside end of a left inner wing. A cart hitch is mounted rearward of the center ball joint, and an agricultural product cart is hitched to the cart hitch. When right and left wings are in a field operating position the right and left wings extend laterally substantially perpendicular to the operating travel direction. When moving to a transport position, the right and left inner wings pivot about the center ball joint and the right and left wings trail rearward to a side by side transport position substantially aligned with the operating travel direction, and the wing frames of the right and left wings are connected together by a transport lock. The cart hitch is configured such that when the wings are in the field operating position, the cart is rearward of, and in proximity to, the center ball joint, and when the wings are moved to the transport position the cart hitch moves rearward such that during transport, the cart is rearward of rear ends of the trailing wings.

The implement apparatus typically has two or three wings on each side and in the field operating position can be about 100 or more feet wide. The apparatus conveniently provides a wide rear folding implement that transports in a narrow width for travel along roads, and tows the agricultural products cart close to the rear end of the implement during field operations for good maneuverability.

In a third embodiment, a two stage hydraulic cylinder apparatus comprising a substantially cylindrical barrel divided into separate first and second chambers by an internal divider plate is disclosed. A first piston is slidingly sealed to an internal wall of the first chamber, and a first piston rod extends from the first piston through a first cap sealing the first chamber, such that a first blind chamber portion is formed between the first piston and the divider plate and a first rod chamber portion is formed between the first piston and the first cap. A second piston is slidingly sealed to an internal wall of the second chamber, and a second piston rod extends from the second piston through a second cap sealing the second chamber such that a second blind chamber portion is formed between the second piston and the divider plate and a second rod chamber portion is formed between the second piston and a second cap. First and second blind ports extend through a wall of the barrel into the corresponding first and second blind chamber portions, and first and second rod ports extend through the wall of the barrel into the corresponding first and second rod chamber portions.

The two stage hydraulic cylinder apparatus provides controlled independent movement of each rod. The apparatus can then be connected to two separate hydraulic circuits such that pressurized hydraulic fluid in one circuit will extend and retract the first rod, while pressurized hydraulic fluid in the other circuit will extend and retract the second rod. Thus the length of the apparatus can be controlled through a full range from a maximum length where both rods are fully extended, to an intermediate length where one rod is fully extended and one rod is fully retracted, and to a minimum length where both rods are fully retracted. In some applications such a two stage hydraulic cylinder can reduce the complexity of a linkage arrangement for manipulating parts.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIGS. 1 and 1A are, respectively, perspective and top views of an embodiment of an implement apparatus in the field operating position;

FIGS. 7 and 7A are, respectively, top and perspective views of the embodiment of FIG. 1 with wings in the transport position and locked together, and with forewing frames in the lowered position;

FIGS. 15 and 15A are, respectively, top and perspective views of the embodiment of FIG. 1 fully in the field operating position hitched to an air seeder cart and tractor;

DETAILED DESCRIPTION

Figure 1:
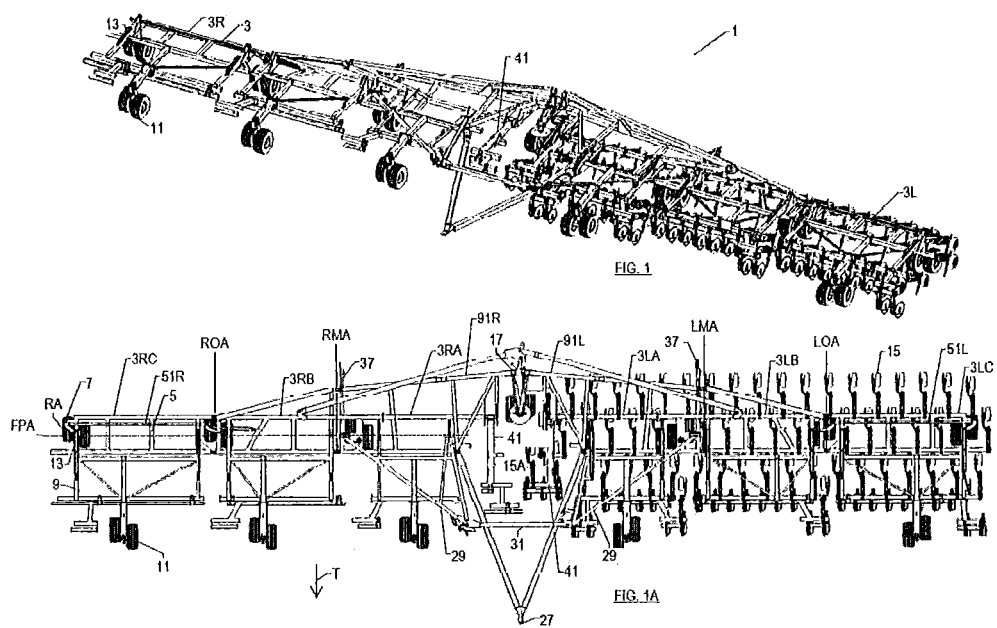
Figure 2:
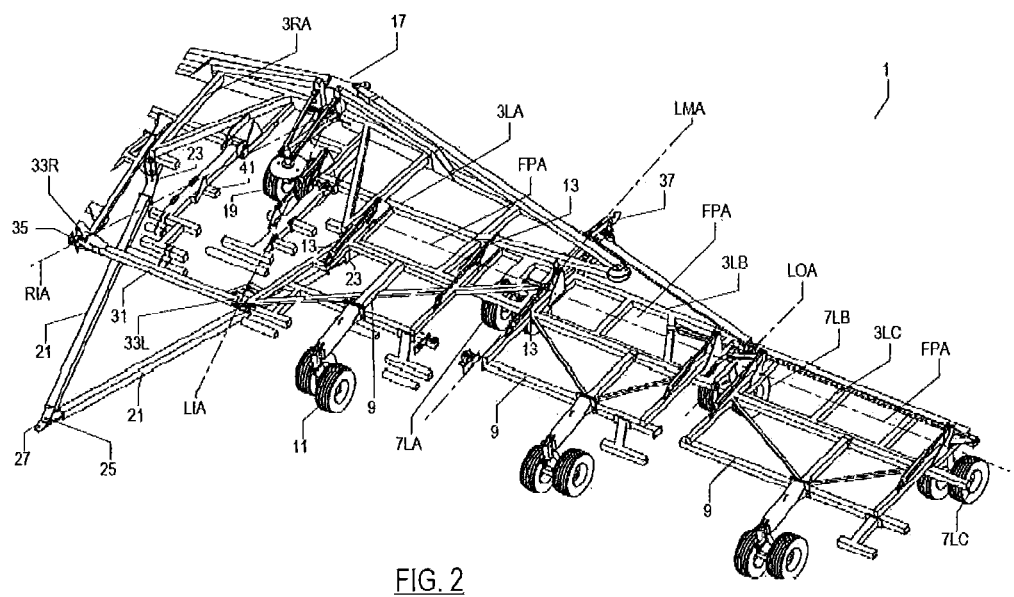
FIG. 2 is a front perspective view of the left side of the embodiment of FIG. 1 in the field operating position.
Figure 8:
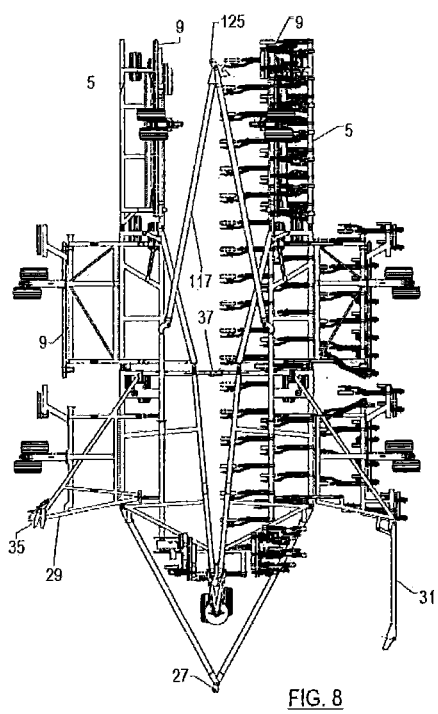
FIGS. 8 and 8A are, respectively, top and perspective views of the embodiment of FIG. 1 with wings in the transport position and locked together, and with forewing frames of the right and left outer wings in the raised position.
Figure 8A:
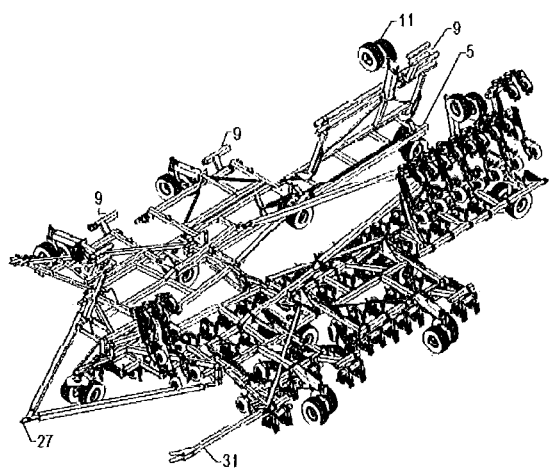
Figure 9:
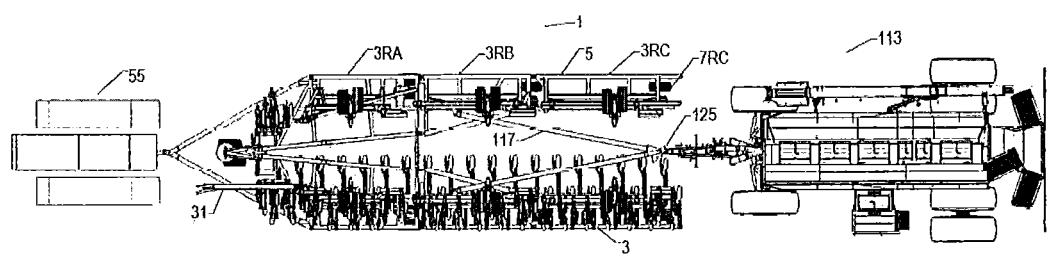
FIGS. 9, 9A, and 9B are, respectively, top, side, and perspective views of the embodiment of FIG. 1 with an agricultural product cart hitched to the cart hitch thereof and a tractor hitched to the tow hitch thereof, with wings in the transport position and locked together, and with all forewing frames in the raised position, such that the apparatus is in full transport position.
Figure 9A:
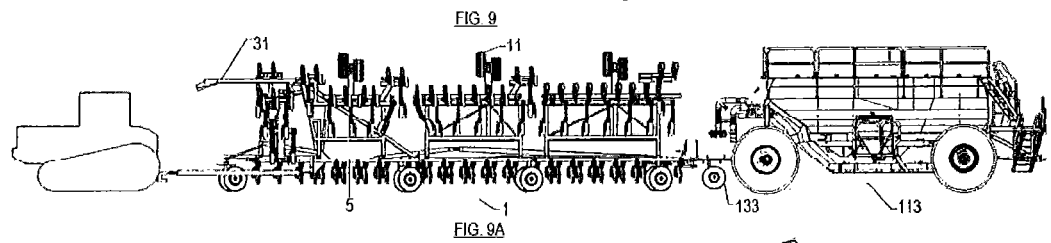
Figure 9B:
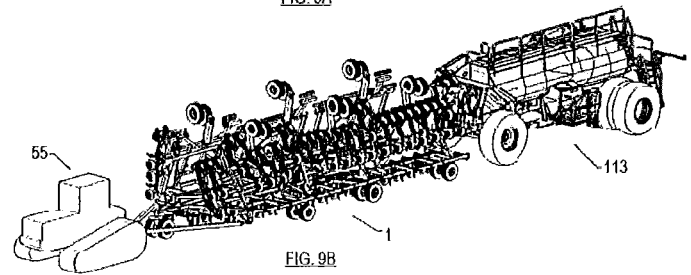

FIGS. 1-15 illustrate an embodiment of a rear folding implement apparatus 1. The apparatus comprises a plurality of wings 3, each wing comprising a wing frame 5 supported on rear wheels 7 for movement along the ground. A forewing frame 9 is pivotally attached to the wing frame about a substantially horizontal forewing pivot axis FPA oriented substantially perpendicular to an operating travel direction T when the forewing frame 9 is in a field operating position shown in FIGS. 1, 1A. A forewing wheel 11 is mounted to a forward portion of the forewing frame 9, and a forewing actuator 13 is mounted on the wing frame 5 and is operative to pivot the forewing frame 9 from a raised position, where the forewing frame extends upward from the wing frame with the forewing wheel above the ground as shown in FIG. 9, to a lowered position where the forewing frame 9 extends forward from the wing frame as shown in FIG. 1. The forewing wheel 11 supports the forewing frame 9 for movement along the ground.

Ground engaging tools 15 are mounted on the wing frames 5 and on the forewing frames 9 of each wing 3. In the drawings where the entire apparatus 1 is illustrated, the ground engaging tools 15 are shown mounted on the left side of the apparatus 1, while the ground engaging tools 15 are removed on the right side to facilitate clear illustration of the apparatus 1. Where for example the implement apparatus 1 is an air seeder implement, the ground engaging tool 15 will be furrow openers adapted to deposit agricultural products into furrow in the soil.

The illustrated apparatus has three right wings 3R on the right side and three left wings 3L on the left side. A center ball joint 17 pivotally connects an inside end of the wing frame 5 of a right inner wing 3RA to an inside end of the wing frame 5 of a left inner wing 3LA, and a center wheel assembly 19 supports the center ball joint 17. The ball joint 17 can be provided by the conventional ball and socket type joint, or by any mechanism that allows substantially the same degree of pivotal movement.

The wing frame 5 of a right middle wing 3RB is pivotally connected at an inside end thereof to an outside end of the wing frame of the right inner wing 3RA about a right middle wing axis RMA oriented substantially horizontal and parallel to the operating travel direction T, and the wing frame of a right outer wing 3RC is pivotally connected at an inside end thereof to an outside end of the wing frame of the right middle wing 3RB about a right outer wing axis ROA oriented substantially parallel to the axis RMA.

The left side is the same with a left middle wing 3LB pivotally connected at an inside end thereof to an outside end of the wing frame of the left inner wing 3LA about a left middle wing axis LMA oriented substantially horizontal and parallel to the operating travel direction T, and the wing frame of a left outer wing 3LC is pivotally connected at an inside end thereof to an outside end of the wing frame of the left middle wing 3LB about a left outer wing LOA axis oriented substantially parallel to the axis LMA.

Right and left tow hitch poles 21 are each pivotally connected at rear ends thereof to the wing frames 5 of respective right and left inner wings 3RA, 3LA at ball joints 23 and are pivotally connected to each other at the vertical axis of a tow hitch joint 25 in proximity to opposite front ends thereof, and a tow hitch plate 27 extends forward from the tow hitch joint 25 for attachment to a towing vehicle, typically a tractor.

In order to secure the right and left wings 3R, 3L in the field operating position, in the illustrated apparatus 1 the forewings 9 of the right and left inner wings 3RA, 3LA include forward extending members 29 which, when in the field operating position, are connected together by a connector bar 31. The connector bar 31 holds the right and left wings 3R, 3L together and laterally aligned and prevents same from pivoting about the center ball joint 17.

Thus when right and left wings 3R 3L are in a field operating position the wings extend laterally substantially perpendicular to the operating travel direction T, and the forewing frames 9 of the wings are in the lowered position, as illustrated in FIG. 1. The connector bar 31 extends laterally above the tow hitch poles 21 and is attached at a right end thereof to forward extending member 29 at a forward inside portion of the forewing frame of the right inner wing 3RA at a right bar joint 33R, and is attached at an opposite left end thereof to forward extending member 29 at a forward inside portion of the forewing frame of the left inner wing at a left bar joint 33L, such that the right and left wings 3R, 3L extend substantially perpendicular to the operating travel direction T.

The right and left bar joints 33R, 33L and the center ball joint 17 are configured such that the right inner wing 3RA is free to pivot about a right inner wing axis RIA extending substantially through the right bar joint 33R and the center ball joint 17, and the left inner wing 3LA is free to pivot about a left inner wing axis LIA extending substantially through the left bar joint 33L and the center ball joint 17. The bar joints 33R, 33L are resilient joints allowing movement as required, and can be provided by a combination of ball joints, oversize holes or slots with undersize pins, resilient urethane pucks, or the like.

Thus in the field operating position each wing 3 is free to pivot with respect to adjacent wings to follow ground contours. The middle and outer wings 3RB, 3RC, 3LB, 3LC pivot about axes that are parallel to the operating travel direction T, while the inner wings 3RA, 3LA pivot about axes that are oriented at an angle to the operating travel direction T, but that still allow sufficient motion to allow satisfactory ground following.

Figure 7:
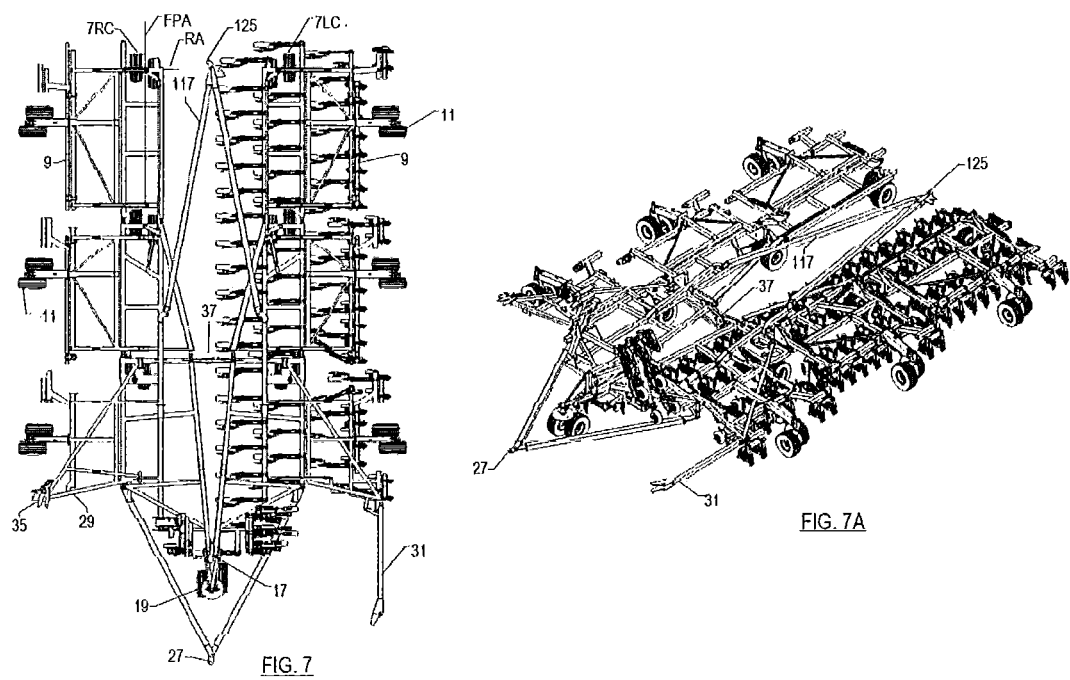

To move the wings 3 into a transport position, the connector bar 31 is released at a bar latch 35, which is shown at the right connector joint 33R but which could be on either end of the connector bar 31. When the connector bar 31 released, it is supported in a substantially horizontal position by braces 32 such that when returning to field operating position, the bar latch 35 will re-engage. With the latch 35 released, the right and left inner wings 3RA, 3LA, are free to pivot about the center ball joint 17, and when the tow hitch plate 27 is towed forward that the right and left inner wings 3RA, 3LA pivot about the center ball joint 17 and the wings 3R, 3L on each side trail rearward to a side by side transport position substantially aligned with the operating travel direction T as shown in FIG. 7, and the transport lock 37 latches to connect he wing frames 5 of the right and left wings 3R, 3L.

The forewing frames 9 are then moved to the raised position. FIG. 8 show the forewing frames 9 of the outer wings 3RC, 3LC raised, while FIG. 9 shows all the forewing frames raised. The forewing frames 9 move to an over-centered upright position somewhat past the vertical, such that stress on the forewing actuators during transport is reduced. In the illustrated apparatus 1, the individual wing frames 5 are unstable unless the forewing frames 9 are being pushed down by the forewing actuators 13 with the forewing wheels 11 pressing against the ground. Thus the wing frames 5 of the right and left inner wings 3RA, 3LA are connected by the transport lock 37 prior to raising the forewing frames 9. The transport lock 37 is described in more detail below.

Figure 16:
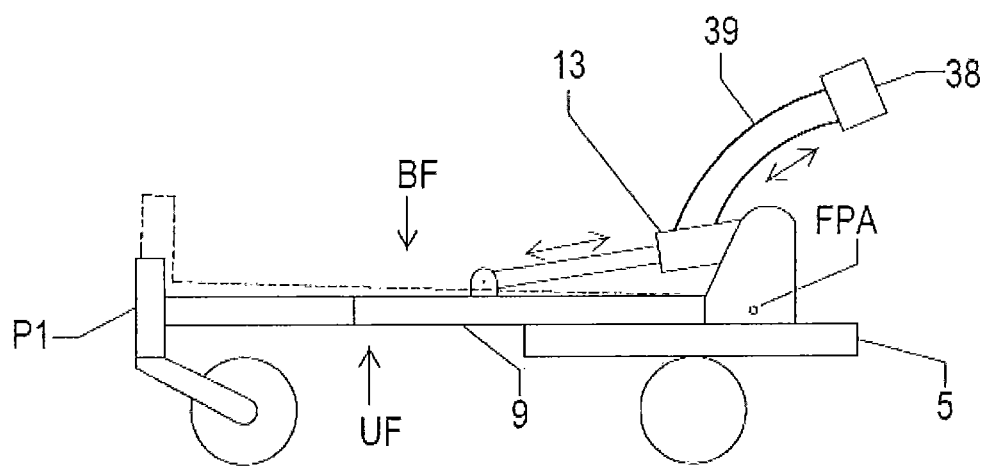
FIG. 16 is a schematic side view of the attachment of the forewing frame to the wing frame.

When the wings 3 are in the field operating position, the forewing actuators 13 are operative to maintain the forewing frames 9 in a desired orientation with respect to the wing frames 5. As schematically illustrated in FIG. 16, the forewing actuator 13 can be operative to simply fix the forewing frame 9 in position P1 with respect to the wing frame 5. Typically the forewing actuator 13 is a hydraulic cylinder, and the forewing 9 is fixed by extending the hydraulic cylinder so that the forewing frame 9 bears against the wing frame 5, and then closing valves to the conduits 39 to the hydraulic cylinder to prevent movement of hydraulic fluid. It is also contemplated that the forewing actuator 13 could be provided by a hydraulic cylinder connected to an active hydraulic source 38 where the hydraulic fluid in the hydraulic cylinder is maintained at a constant pressure, and can then flow in and out of the hydraulic cylinder in response to forces exerted on the forewing frame 9. The forewing actuator then exerts a downward bias force BF on the forewing frame 9 with respect to the wing frame 5 such that the forewing frame 9 moves to the fully lowered position P1 in response to the bias force BF, and moves upward as indicated by the phantom lines in response to an upward force UF that is greater than the bias force BF. Ground following may be improved using such an actuator arrangement.

Figure 3:
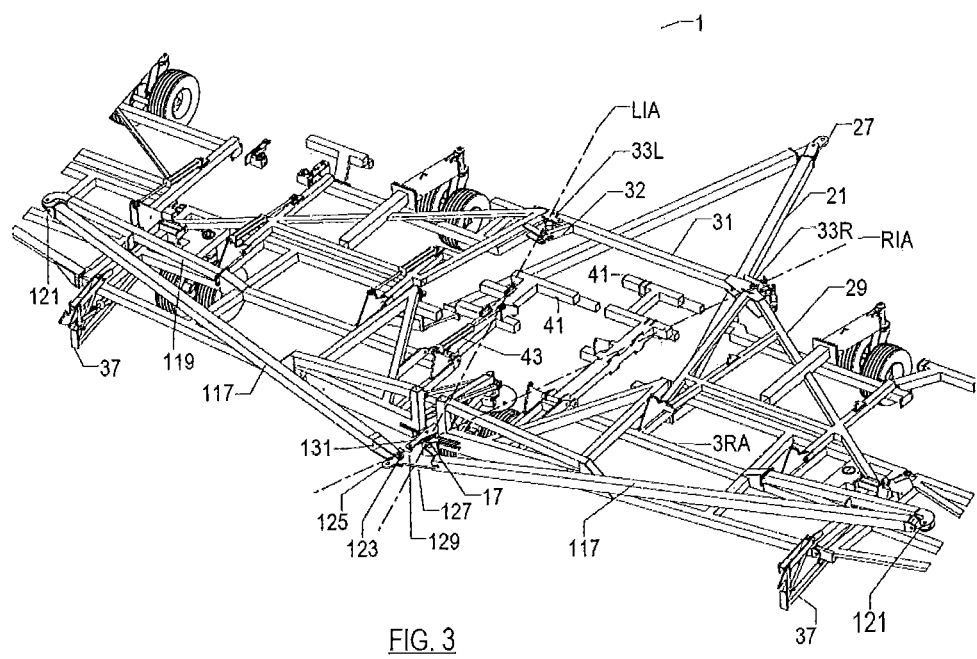
FIG. 3 is a rear perspective view of the central portion of the embodiment of FIG. 1 in the field operating position.
Figure 4:
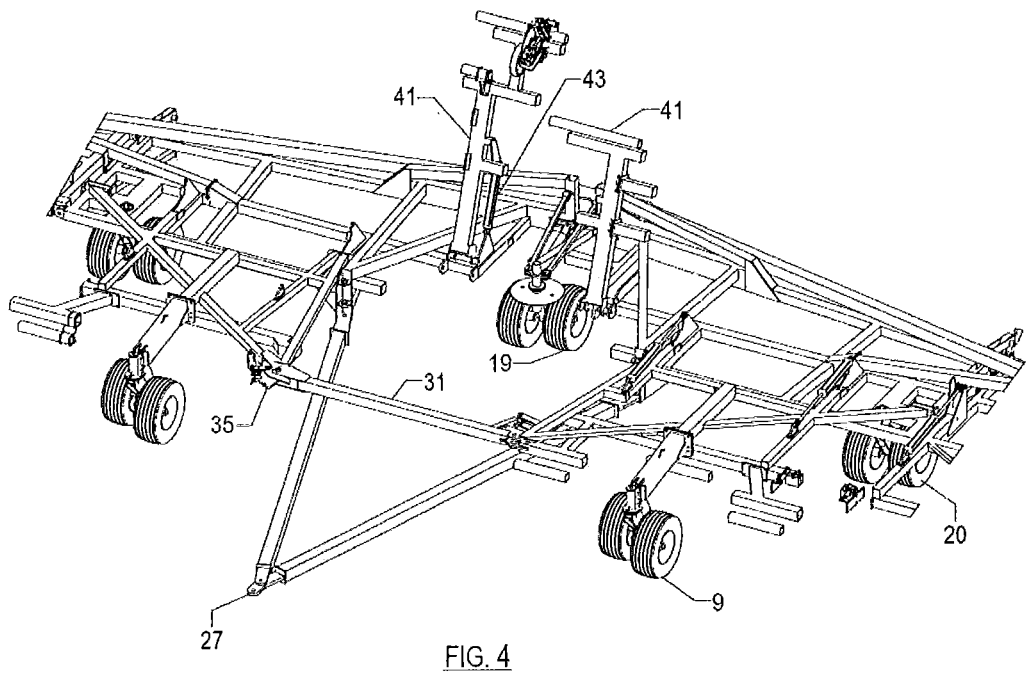
FIG. 4 is a front perspective view of the central portion of the embodiment of FIG. 1 with wings in the field operating position, and auxiliary frames in the raised position for transport.

In order to provide ground engaging tools 15 in front of the center wheel assembly 19, in the illustrated apparatus 1 the right and left inner wings 3RA, 3LA each comprise an auxiliary frame 41 pivotally attached to an inner portion of the respective wing frame 5 about a substantially horizontal pivot axis oriented substantially perpendicular to the operating travel direction, and an auxiliary actuator 43 mounted on the wing frame 5 and operative to pivot the auxiliary frame 41 from the raised position shown in FIG. 4, where the auxiliary frame 41 extends upward from the wing frame 5, to a lowered position shown in FIG. 3 where the auxiliary frame 41 extends forward from the wing frame 5 and is substantially fixed with respect to the wing frame 5. Auxiliary ground engaging tools 15A are mounted on the auxiliary frames 41 and when the right and left inner wings 3RA, 3LA are in the field operating position, the auxiliary frames 41 are in the lowered position and the auxiliary ground engaging tools 15A are located ahead of the center wheel assembly 19 as illustrated in FIG. 1.

Figure 10:
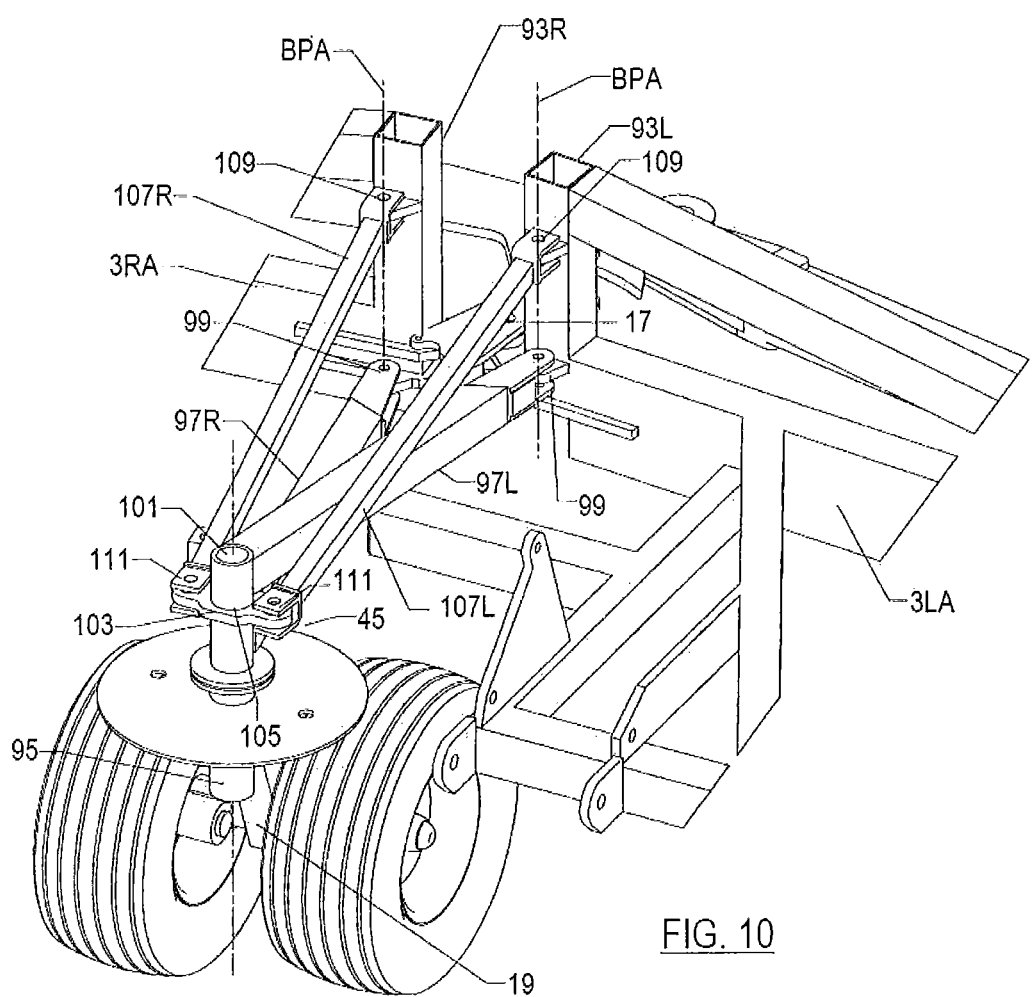
FIG. 10 is a front perspective view of the center wheel assembly of the embodiment of FIG. 1 with wings in the field operating position.
Figure 11:
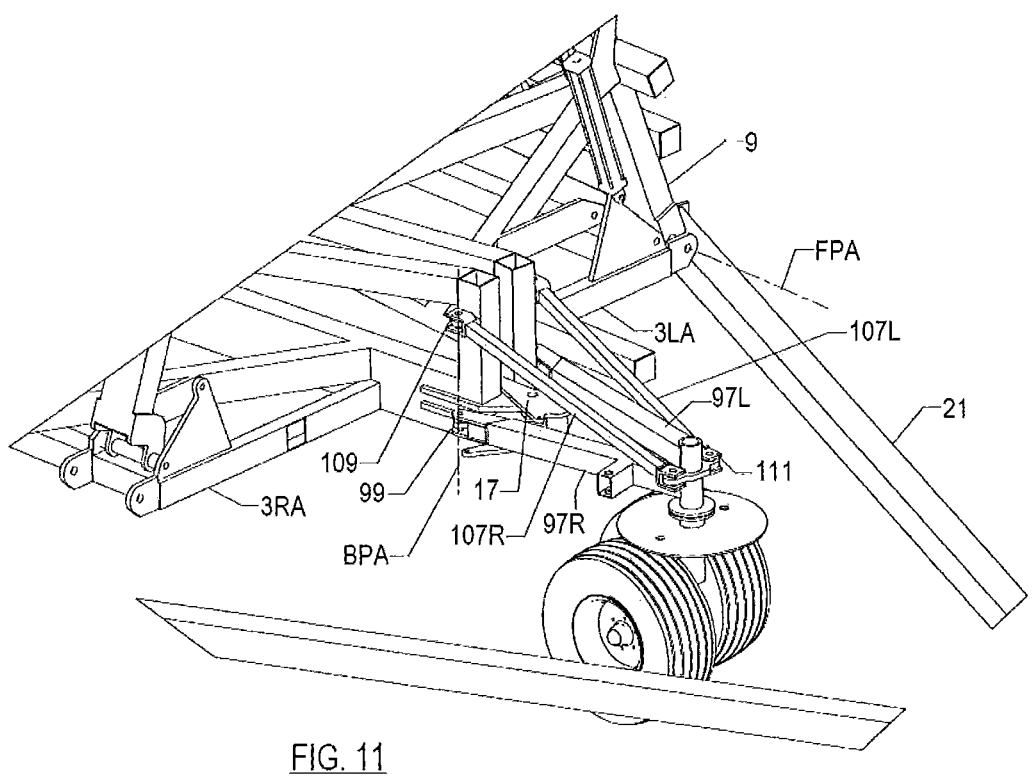
FIG. 11 is a front perspective view of the center wheel assembly of the embodiment of FIG. 1 with wings in the rearward trailing transport position.

In the apparatus 1, the forewing wheels 11 are caster wheel assemblies, shown with two tandem type wheels for increased support. The caster wheel assemblies allow the front of the apparatus 1 to move laterally when making a turn. The center wheel assembly 19 is also a caster wheel assembly, however a caster wheel lock 45 is operative to selectively lock the center caster wheel assembly 19 with wheels thereof oriented to roll in the operating travel direction, substantially as illustrated in FIG. 10, and a caster wheel lock control operative is to engage and disengage the caster wheel lock 45. The caster wheel lock 45 is typically engaged when the wings 3 are in the field operating position and released so the caster wheel assembly can caster in the transport position. Engagement and dis-engagement of the caster wheel lock 45 is conveniently provided by connecting a hydraulic cylinder actuator 47 to hydraulic cylinders providing the auxiliary actuators 43 that raise the auxiliary frames 41, so when the auxiliary frames are lowered for field work, the caster wheel lock 45 engages, and then when the auxiliary frames 41 are raised for transport, the caster wheel lock 45 disengages. An example of a caster wheel lock 45 is described below and schematically illustrated in FIG. 22.

The rear wheels 7 include a castering right inner rear wheel 7RA assembly supporting the wing frame of the right inner wing 3RA, and a castering left inner rear wheel assembly 7LA supporting the wing frame of the left inner wing 3LA. The right and left inner rear wheel assemblies 7RA, 7LA are castering wheel assemblies which, like the centre wheel assembly 19, are locked when in field operating position and are free to caster about a substantially vertical caster axis during transport. A caster wheel lock and hydraulic connections as described above with respect to the center wheel assembly are provided for the right and left inner rear wheel assemblies 7RA, 7LA.

A right middle rear wheel assembly 7RB supports the wing frame of the right middle wing 3RB, and a left middle rear wheel assembly 7LB supports the wing frame of the left middle wing 3LM. A right outer rear wheel assembly 7RC supports the wing frame of the right outer wing 3RC, and a left outer rear wheel assembly 7LC supports the wing frame of the left outer wing 3LC.

A rear wheel control system 49 is operative to pivot the right and left middle and outer rear wheel assemblies 7RB, 7LB, 7RC, 7LC such that a rotational axis RA of wheels of the rear wheel assemblies moves from a field operating position substantially parallel to the forewing pivot axes FPA, as shown in FIG. 1, through a pivot range of about 90 degrees to a transport position substantially perpendicular to the forewing pivot axes FPA as shown in FIG. 7.

Figure 12:
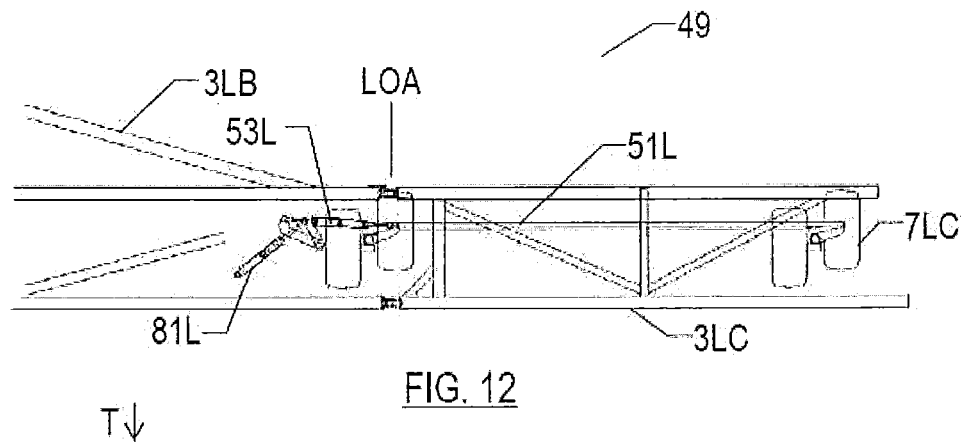
FIGS. 12-12B are top views of the left middle and outer rear wheel assemblies moving from the field operating position to the transition angle of 45 degrees and finally to the transport position.
Figure 12A:
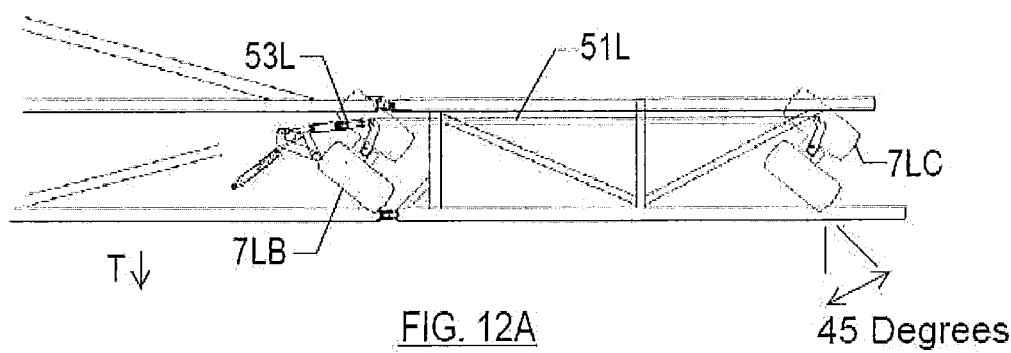

To facilitate moving the wings 3 from the laterally extending field operating position to the trailing transport position the apparatus 1 provides a mechanism to place the right and left middle and outer rear wheel assemblies 7RB, 7LB, 7RC, 7LC into a transition position in the middle of the pivot range at an angle of about 45 degrees with respect to the forewing pivot axes FPA, as shown in FIG. 12A.

Figure 12B:
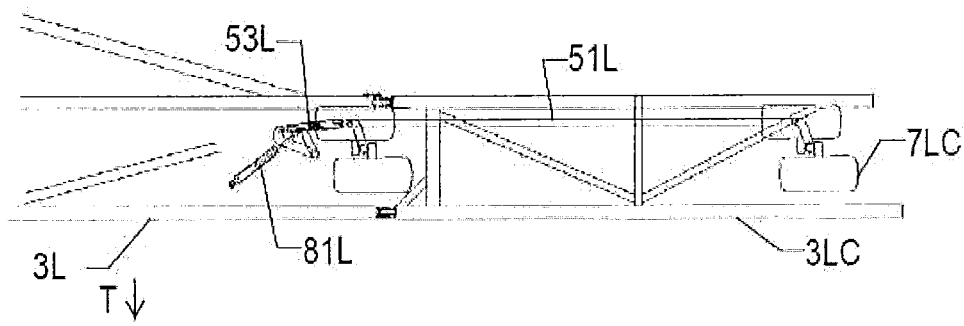
Figure 13:
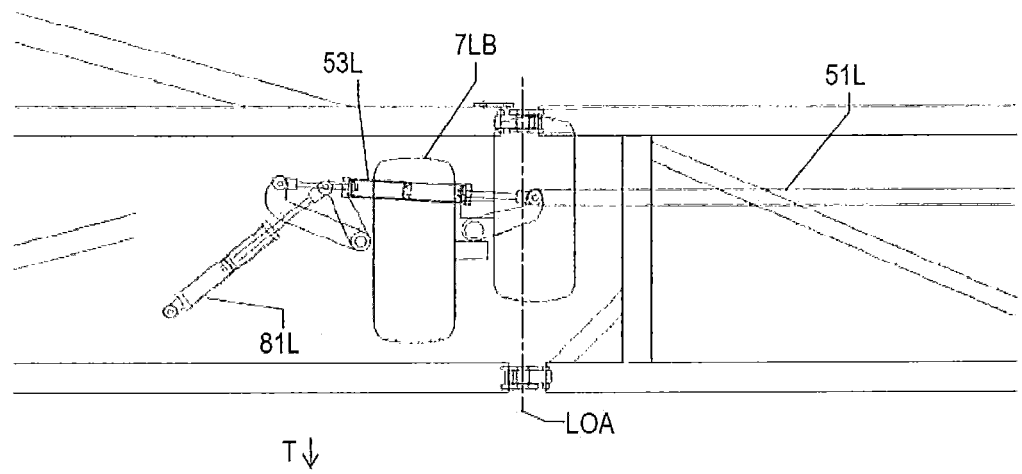
FIG. 13 is a top view of the left transport and steering hydraulic cylinders and the linkages between the hydraulic cylinders and the steering arm.

The right middle and outer rear wheel assemblies 7RB, 7RC are linked by a right steering shaft 51R, and the left middle and outer rear wheel assemblies 7LB, 7LC are linked by a left steering shaft 51L such that the right middle and outer rear wheel assemblies 7RB, 7RC pivot together, and the left middle and outer rear wheel assemblies 7LB, 7LC pivot together. The rear wheel control system 49 comprises a right transport hydraulic cylinder 53R linked to the right steering shaft 51R and a left transport hydraulic cylinder 53L linked to the left steering shaft 51L. FIGS. 12-12B show some detail of the left steering shaft 51L, transport hydraulic cylinder 53L, and middle and outer rear wheel assemblies 7LB, 7LC, and the right hand side is configured the same and operates in the same manner.

Figure 5:
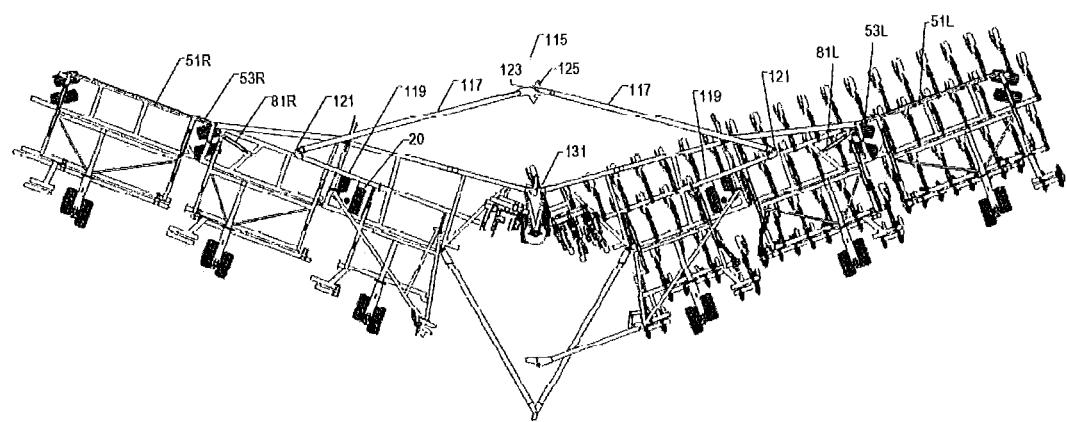
FIG. 5 is a top view of the embodiment of FIG. 1 in an initial transition position with wings moving between the field operating position and the transport position.
Figure 6:
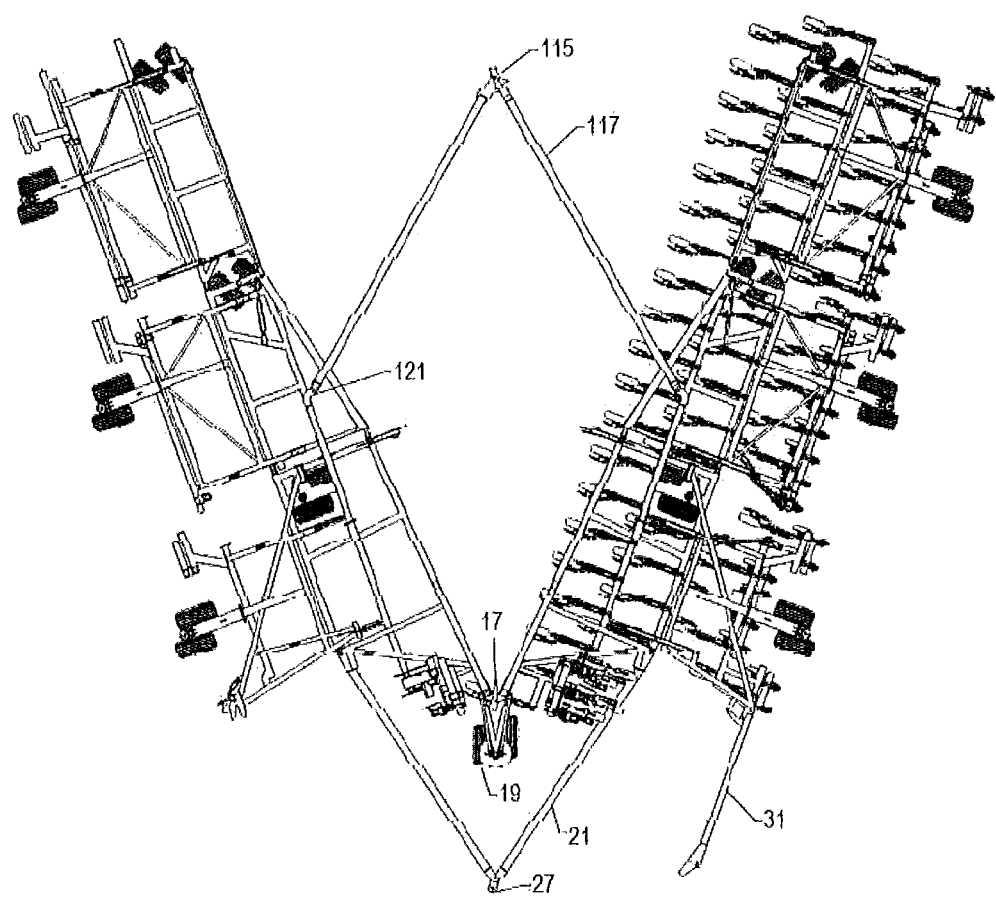
FIG. 6 is a top view of the embodiment of FIG. 1 in a more progressed transition position with wings moving between the field operating position and the transport position.

The left transport hydraulic cylinder 53L is operative to move the corresponding left steering shaft 51L to pivot the respective wheel assemblies 7LB, 7LC from the field operating position of FIG. 12, to the transition angle of about 45 degrees shown in FIG. 12A, and to maintain the wheel assemblies 7LB, 7LC at the transition angle of about 45 degrees as the wings 3 move from the field operating position to the trailing transport position as illustrated in FIGS. 5 and 6, and is then operative, when the wings 3 reach the full transport position of FIG. 7, to pivot the respective wheel assemblies 7LB, 7LC from the transition angle to the transport position where rotational axes RA of the are substantially perpendicular to the forewing pivot axes FPA.

Figure 17:
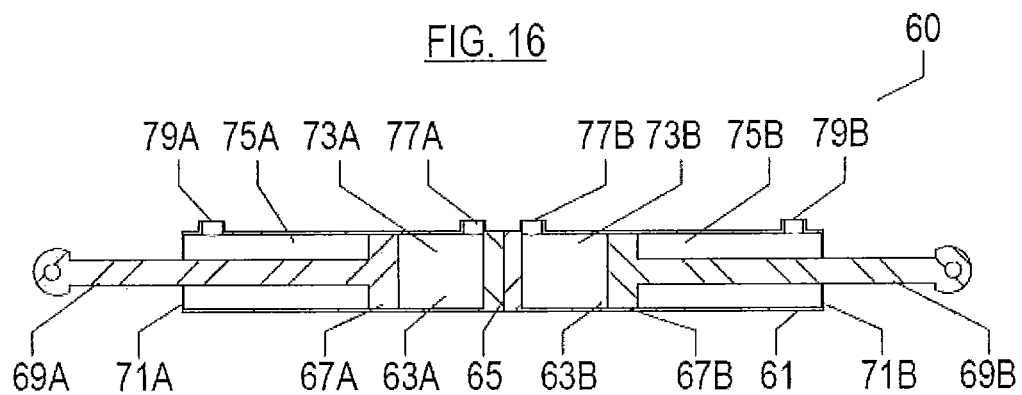
FIG. 17 is a schematic cut-away side view of the two stage transport hydraulic cylinder.

Conveniently the transport hydraulic cylinders 53R, 53L are provided by a two stage hydraulic cylinder apparatus 60 as schematically illustrated in FIG. 17. The apparatus 60 comprises a substantially cylindrical barrel 61 divided into separate first and second chambers 63A, 63B by an internal divider plate 65. A first piston 67A is slidingly sealed to an internal wall of the first chamber 63A, and a first piston rod 69A extends from the first piston 67A through a first cap 71A sealing the first chamber 63A. A first blind chamber portion 73A is thus formed between the first piston 67A and the divider plate 65 and a first rod chamber portion 75A is formed between the first piston 67A and the first cap 71A.

Similarly second piston 67B is slidingly sealed to an internal wall of the second chamber 63B, and a second piston rod 69B extends from the second piston 67B through a second cap 71B sealing the second chamber 63B. A second blind chamber portion 73B is thus formed between the second piston 67B and the divider plate 65 and a second rod chamber portion 75B is formed between the second piston 67B and the second cap 71B.

It is contemplated that, instead of a single barrel 61 divided by a divider plate 65, blind ends of the first and second chambers 63A, 63B could be offset or oriented at an angle to suit a particular application.

First and second blind ports 77A, 77B extend through a wall of the barrel 61 into the corresponding first and second blind chamber portions 73A, 73B, and first and second rod ports 79A, 79B extend through the wall into the corresponding first and second rod chamber portions 75A, 75B.

The first and second pistons 67A, 67B therefore move independently in response to hydraulic fluid directed into one of the ports. Thus in the present application of the two stage hydraulic cylinder apparatus 60 as the left transport hydraulic cylinder 53L illustrated in FIGS. 12 and 13, the apparatus 60 is mounted and configured such that the first piston 67A moves through a full range of motion from one end of the first chamber 63A to an opposite end of the first chamber 63A to pivot the respective wheel assemblies 7LB, 7LC to the transition angle as shown in FIG. 12A, and the second piston 67B moves through its full range of motion from one end of the second chamber 63B to an opposite end of the second chamber 63B to pivot the respective wheel assemblies 7LB, 7LC from the transition angle of FIG. 12A to the transport position of FIG. 12B.

As described above the right and left inner wings 3RA, 3LA of the illustrated apparatus 1 each comprise an auxiliary frame 41 pivotally attached to an inner portion of the respective wing frame 5 and an auxiliary actuator 43 mounted on the wing frame 5 and operative to pivot the auxiliary frame 41 from the raised position for transport to the lowered position for field operations. The auxiliary frames are moved up to the raised position as one of the first steps in moving the wings 3 from the field operating position to the transport position. Thus in the illustrated apparatus 1, conveniently each auxiliary actuator 43 is provided by a hydraulic cylinder and conduits connect ports of the auxiliary actuator 43 hydraulic cylinder to the blind and rod ports 77A, 79A of the first chamber 63A such that when the auxiliary actuator 43 hydraulic cylinder is activated to raise the auxiliary frames 41, hydraulic fluid is also directed into the first rod chamber portion 75A to retract the first rod 69A to its fully retracted position and thus pivot the left middle and outer rear wheel assemblies 7LB, 7LC from the field operating position of FIG. 12 to the transition angle shown in FIG. 12A The tow hitch 27 is then towed forward and the wings 3 trail back to the transport position of FIG. 7. In the illustrated apparatus 1 the forewing actuators 13 are also provided by forewing hydraulic cylinders and the second chamber 63B of the left transport hydraulic cylinder 53L is connected by conduits to the left forewing hydraulic cylinders. As described above when the wings 3 are in the transport position of FIG. 7, the forewing actuators 13 are activated to move the forewing frames 9 to the raised position. Hydraulic fluid is thus directed into the into the second rod chamber portion 75B to retract the second rod 69B to its fully retracted position and thus pivot the left middle and outer rear wheel assemblies 7LB, 7LC from the transition angle shown in FIG. 12A to the transport position shown in FIG. 12B.

The rear wheel control system 49 for pivoting the right and left middle and outer rear wheel assemblies 7RB, 7LB, 7RC, 7LC is therefore activated by the same hydraulic controls on the towing tractor 55 that activates the auxiliary and forewing actuators.

Figure 14:
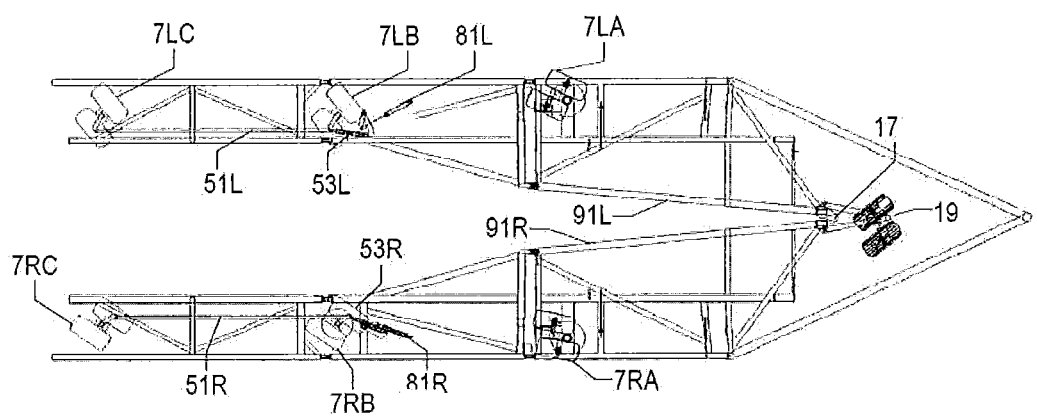
FIG. 14 is a schematic top view of the embodiment of FIG. 1 with wings in the trailing transport position and right and left middle and outer rear wheel assemblies pivoted by the steering hydraulic cylinders to make a sharp left turn, and with right and left inner rear wheel and center wheel assembly assemblies pivoted on their caster axes to follow the turn.

To improve maneuverability, the rear wheel control system 49 further comprises right and left steering hydraulic cylinders 81R, 81L linked to the right and left steering shafts 51R, 51L wherein each steering hydraulic cylinder 81R, 81L is operative to pivot the respective right and left middle and outer rear wheel assemblies 7RB, 7LB, 7RC, 7LC toward the right and left of the transport position to steer the wings when the wings are in the transport position, as illustrated in FIG. 14. The steering hydraulic cylinders 81R, 81L are in a neutral mid point of their extension/retraction range when the right and left middle and outer rear wheel assemblies 7RB, 7LB, 7RC, 7LC are in the transport and the field operating positions. In the field operating position, the steering hydraulic cylinders 81R, 81L can be used to reduce skewing by steering up a side-hill slope for example.

Figure 18:
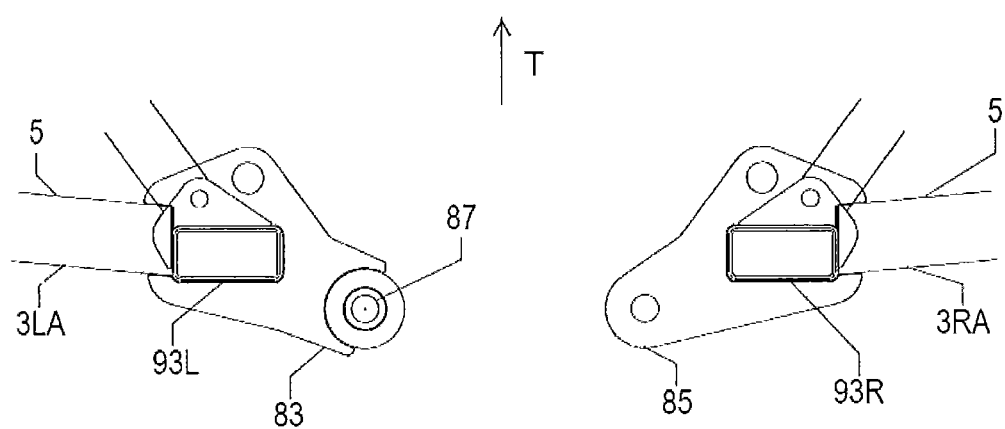
FIG. 18 is top view showing the center ball joint disconnected.
Figure 19:
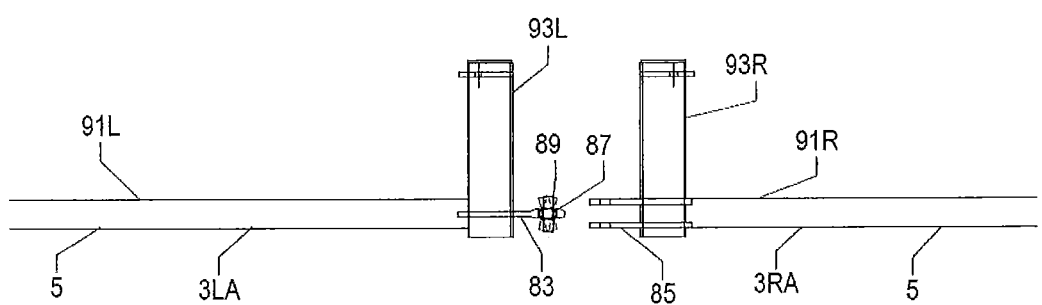
FIG. 19 is rear view showing the center ball joint disconnected.
Figure 20:
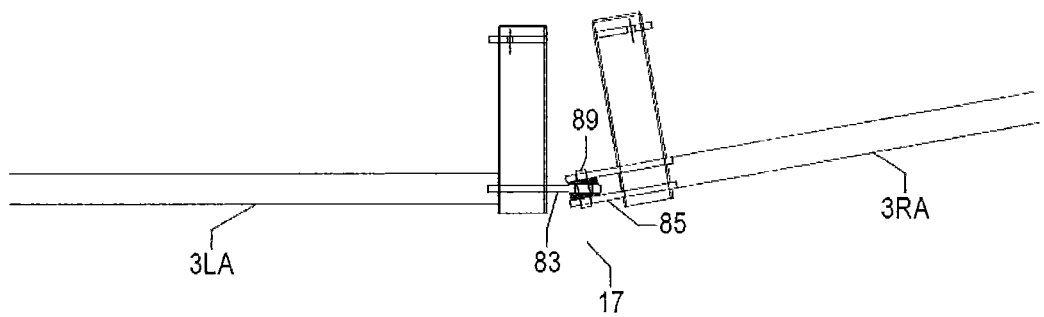
FIG. 20 is rear view showing the center ball joint connected.

The center ball joint 17 is illustrated in FIGS. 18-20. FIGS. 18 and 19 show respectively top and rear views of the center ball joint 17 disconnected, and FIG. 20 shows a rear view of the connected ball joint 17. A tongue 83 extends laterally from the inside end of the wing frame 5 of the left inner wing 3LA, and a corresponding clevis 85 extends laterally from the inside end of the wing frame 5 of the right inner wing 3RA. A ball 87 is mounted in the tongue 83, which can pivot in all directions, and a pin 89 is placed through holes in the clevis 85 and ball 87 to pivotally connect the right and left inner wings 3RA, 3LA. It can be seen that the tongue 83 and clevis 85 also extend somewhat rearward of the wings 3RA, 3LA. Rear members 91R, 91L of the wing frames 5 of the right and left inner wings 3RA, 3LA, to which the tongue 83 and clevis 85 are attached, also slope inward and rearward from outer portions of the wing frames as seen in FIG. 1. This arrangement allows the right and left inner wings 3RA, 3LA, to each pivot about a full 90 degrees about the pin 89 to the trailing position of FIG. 7 without interference.

As best seen in FIG. 10, the center wheel assembly 19 is located forward of the center ball joint. The rear members 91R, 91L of the right and left inner wings 3RA, 3LA comprise corresponding right and left upright oriented beams 93R, 93L at the inside ends thereof, forward of the center ball joint 17. The caster axis of the center wheel assembly 19 is provided by a substantially vertical caster shaft 95 that rotates inside a vertical housing. Right and left main arms 97R, 97L are each connected at rear ends thereof to the corresponding right and left beams at a rear arm ball joint 99, and the caster shaft housing extends upward through arm sleeves 101 defined in a front end of each main atm 97R, 97L. The housing, which is inside the arm sleeves 101 and thus not plainly visible, thus bears any twisting forces exerted by the main arms 97R, 97L that could bind the caster shaft and prevent same from pivoting freely.

A strut plate 103 defines a strut aperture 105 through a middle portion thereof, and the caster shaft 95 extends upward through the strut aperture 105. In the illustrated apparatus the strut plate 103 is located on the caster shaft 95 between the right and left main arms 97R, 97L. Right and left struts 107R, 107L are each connected at rear ends thereof to the corresponding right and left beams 93R, 93L at a rear strut ball joint 109 above the corresponding rear arm ball joint 99, and each strut slopes downward and forward to front ends thereof connected to respective right and left sides of the strut plate 103 at front strut ball joints 111. This arrangement lets the motion of wings 3RA, 3LA about the right and left inner wing axes RIA, LIA occur with both wings receiving the vertical support of the center wheel assembly 19.

The right and left rear arm ball joints 99 and right and left rear strut ball joints 109 define respective right and left substantially vertical beam pivot axes BPA. During the transition from the field operating position of FIG. 10 to the transport position of FIG. 11 the right and left inner wings 3RA, 3LA pivot about the right and left vertical beam pivot axes BPA and about the center ball joint 17, and the main arms 97R, 97L and struts 107R, 107L spread somewhat and as the wings pivot, the center ball joint 17 moves to a position forward of the beam pivot axes BPA.

Figure 15:
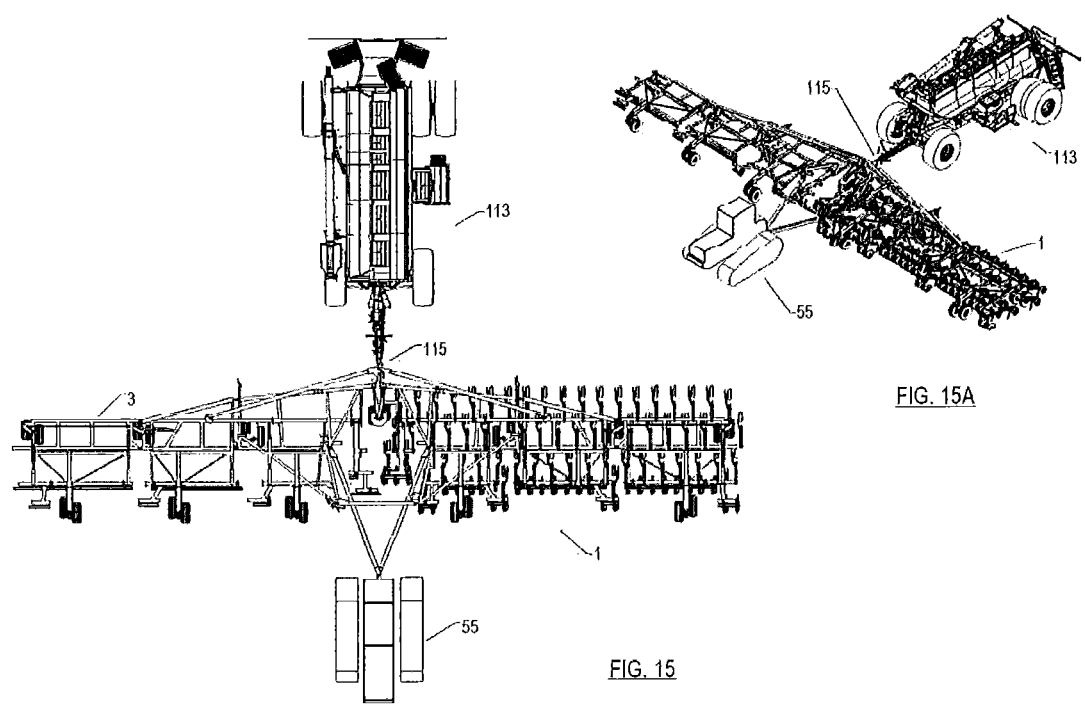

FIGS. 9 and 15 show an agricultural product cart 113 hitched to a cart hitch 115 of the apparatus 1. The cart hitch 115 is configured such that when the wings 3 are in the field operating position shown in FIG. 15, the cart 113 is rearward of, and in proximity to, the center ball joint 17, and when the wings 3 are trailing in the transport position shown in FIG. 9, the cart 113 is rearward of rear ends of the trailing wings 3. It is also contemplated that the product cart could be towed forward of the rear folding implement apparatus 1, such that the tow hitch plate 27 of the apparatus 1 is connected to a drawbar extending rearward from the cart, and the cart hitch 115 is not required, or could be used to tow a liquid fertilizer wagon or the like.

As best seen in FIGS. 3 and 5, the cart hitch 115 comprises right and left cart hitch poles 117, each pivotally attached at an outer end thereof to a wing frame 5 on a corresponding right and left side of the implement apparatus 1. In the illustrated apparatus 1, wing frames 5 of the right and left inner wings 3RA, 3LA include fixed hitch beams 119 that slope upward over the corresponding right and left middle wing axes RMA, LMA to provide a somewhat elevated attachment point for the cart hitch poles 117. The outer ends of the right and left cart hitch poles 117 are attached to the outer ends of the hitch beams 119 by universal joints 121. The cart hitch poles 117 are pivotally connected to each other at a cart hitch ball joint 123 in proximity to opposite inner ends thereof, and a cart hitch plate 125 extends rearward from the cart hitch ball joint 123 for connection to the hitch of the product cart 113.

A hitch lock 127 is operative to releasably lock the cart hitch poles 117 to one of the wings 3RA, 3LA when the wings are in the field operating position. The hitch lock 127 comprises a cart lock plate 129 extending forward from the cart hitch joint 123, and a cart lock mechanism 131 mounted on the inside end of the wing frame 5 of one of the right and left inner wings 3RA, 3LA and operative to releasably lock the cart lock plate 129 to inner wing. The hitch lock 127 includes joints, slots, and the like as required to allow pivotal movement of the wings 3 and cart hitch 115. When the hitch lock 127 is released the cart hitch poles 117 pivot with respect to the wing frames at the universal joints 121 and the cart hitch plate 125 and the attached agricultural products cart 113 move rearward to a location in proximity to rear ends of the trailing wings 3. The hitch of the agricultural products cart 113 can be supported on a wheel 133 such that when the wings are moved back to the field operating position, the cart lock plate 129 is at the correct elevation to re-engage the hitch lock.

Figure 21:
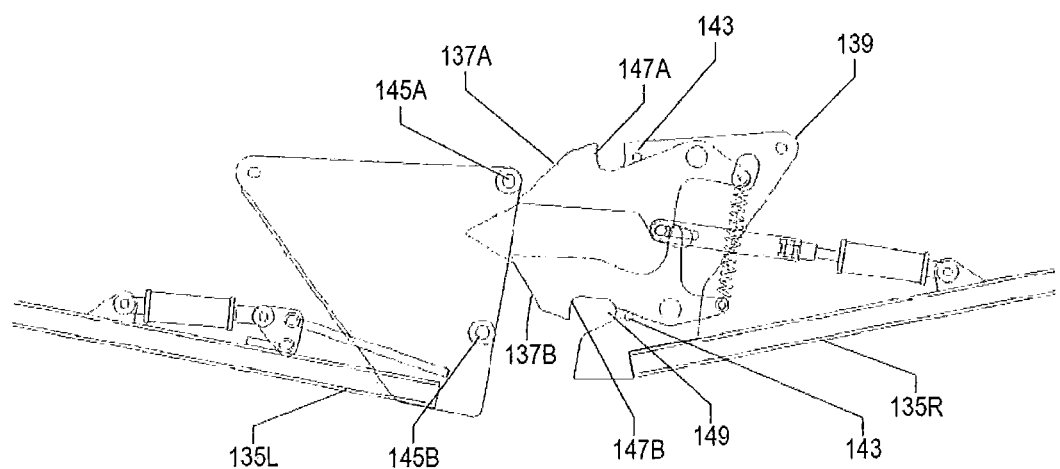
FIGS. 21-21C are rear views of the right and left portions of the transport lock of the embodiment of FIG. 1 approaching each other and then connecting.
Figure 21A:
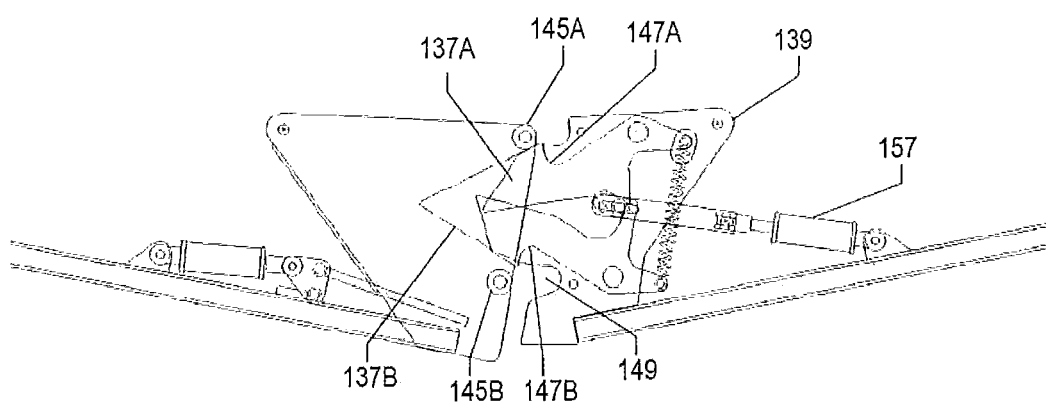
Figure 21B:
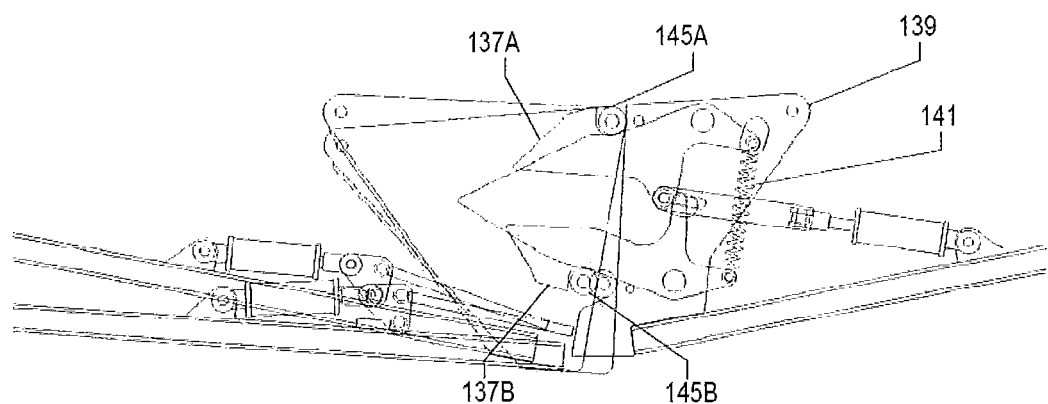

FIGS. 21-21B schematically illustrate a rear view of the right and left portions of the transport lock 37 of the illustrated apparatus 1 approaching each other and then connecting. Right and left lock frames 135R, 135L are mounted to the outer ends of the wing frames of right and left inner wings 3RA, 3LA. Upper and lower lock hooks 137A, 137B are pivotally attached to plate 139 extending up from the right lock frame 135R, and a spring 141 biases the front ends of the lock hooks up and down against stops 143. As the lock frames 135R, 135L approach each other as schematically illustrated in FIG. 21A, the leading points of the upper and lower lock hooks 137A,137B pass respectively under and over upper and lower rollers 145A, 145B and bear against same, pivoting up and down respectively against the spring bias force as the right and left lock frames 135R, 135L move toward each other until the rollers 145A, 145B enter hook recesses 147A, 147B in the lock hooks 137A,137B, and the spring bias force then moves the lock hooks up and down to secure the rollers 145A, 145B in the hook recesses 147A, 147B as shown in FIG. 21B. The lower roller 145B can move into recess 149 in the plate 139 to allow for the right and left sides of the machine to be on uneven ground, as seen in FIG. 21B.

Figure 21C:
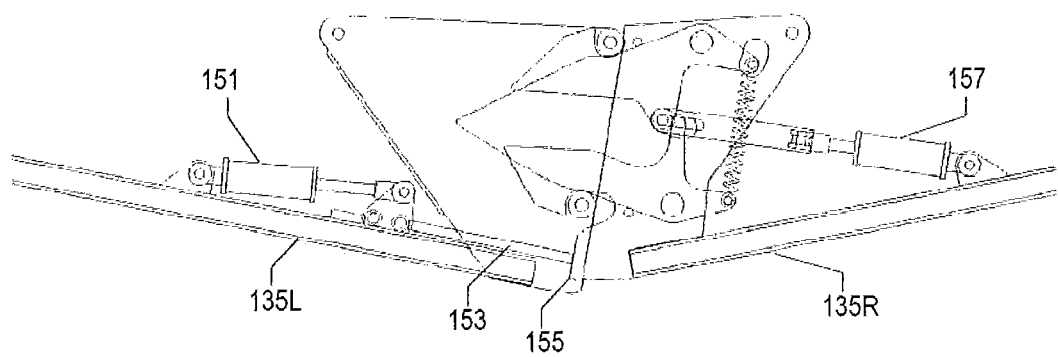

Once the lock hooks are engaged, hydraulic cylinder 151 on the left lock frame 135L is extended to push bar 153 against a bearing surface 155 on the opposite right lock frame 135R to hold the assembly substantially square and rigid, and provide the stability required to allow the forewing frames to be raised for transport as shown in FIG. 21C. Hook actuator 157 can then be extended to prevent the lock hooks 137A, 137B from pivoting.

Figure 22:
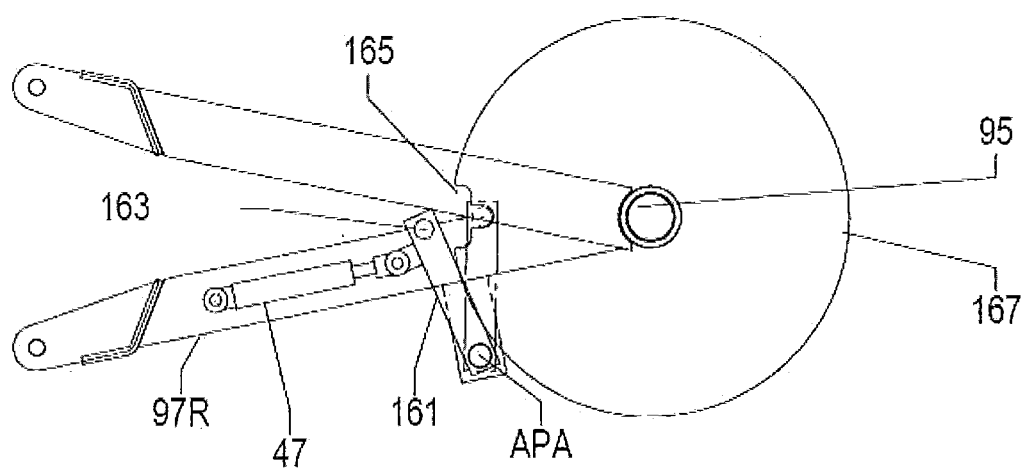
FIG. 22 is a schematic top view of the caster wheel lock.

FIG. 22 schematically illustrates the caster wheel lock 45. A pin arm 161 is pivotally attached to the right main arm 97R at pivot axis APA and a pin 163 on the end of the arm 161 can be moved to engage a recess 165 in a circular plate 167 that rotates with the caster shaft 95. The actuator 47 moves the pin arm 161 to engage or disengage the caster wheel lock 45 by moving the pin 163 into or out of the recess 165. When activated to lock the lock 45, the actuator 47 biases the pin 163 toward the recess, and as the caster wheel pivots during travel, the plate 167 turns and the pin 163 initially enters a wider outside portion of the recess 161, and as the caster wheel continues to pivot slightly, the pin 163 will align with the narrow bottom end of the recess 165 where the caster wheel is locked and further movement is prevented.

The illustrated apparatus 1 has three wings on each side and in the field operating position is about 100 feet wide. It is contemplated that a version with only two wings on each side would be suitable where a narrower implement was desired. The apparatus 1 conveniently provides a wide rear folding implement that transports in a narrow width for travel along roads, and tows the agricultural products cart close to the rear end of the implement during field operations for good maneuverability.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rear folding air seeder implement comprising:
    right and left wings, each wing supported on front and rear wheels for movement along the ground in an operating travel direction, and a plurality of furrow openers mounted on each wing;
    wherein when the right and left wings are in a field operating position the right and left wings extend laterally substantially perpendicular to the operating travel direction;
    wherein when the right and left wings are in a transport position, the right and left wings trail rearward side by side substantially aligned with the operating travel direction;
    a cart hitch movably mounted to the right and left wings and an agricultural product cart hitched to the cart hitch;
    wherein the cart hitch is configured such that when the right and left wings are in the field operating position, the cart is rearward of, and in proximity to, inner ends of the right and left wings, and when the right and left wings are moved to the transport position the cart hitch moves rearward such that during transport, the cart is rearward of rear ends of the trailing right and left wings.

2. The apparatus of claim 1 wherein the cart hitch comprises right and left cart hitch poles, each pivotally attached at an outer end thereof to a corresponding right and left wing, and pivotally connected to each other at a cart hitch joint in proximity to opposite inner ends thereof, a cart hitch plate extending rearward from the cart hitch joint, and a hitch lock operative to releasably lock the cart hitch poles to the wings when the wings are in the field operating position, the hitch lock configured to allow pivotal movement of the wings and cart hitch, and wherein the cart hitch is configured such that when the wings move to the transport position the hitch lock is released and the cart hitch poles pivot with respect to the wings and the cart hitch plate moves rearward to a location in proximity to rear ends of the trailing wings.

3. The apparatus of claim 2 wherein the hitch lock comprises a cart lock plate extending forward from the cart hitch joint, and a cart lock mechanism mounted on the inner end of one of the right and left wings and operative to releasably lock the cart lock plate to the one of the right and left wings.

4. The apparatus of claim 1 wherein the cart hitch is supported vertically when out of the field operating position such that when the right and left wings are moved back to the field operating position, the cart lock plate is at a correct elevation to re-engage the hitch lock.

5. The apparatus of claim 4 wherein the cart hitch is supported on a wheel.

\* \* \* \* \*